(12) United States Patent
Matsuno et al.

(10) Patent No.: US 7,342,909 B2
(45) Date of Patent: Mar. 11, 2008

(54) CDMA TRANSMITTER, CDMA MULTIPLEX TRANSMITTER, CDMA RECEIVER AND CDMA COMMUNICATION SYSTEM

(75) Inventors: Kazuhiko Matsuno, Kanagawa (JP); Masayuki Kashima, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 954 days.

(21) Appl. No.: 10/642,679

(22) Filed: Aug. 19, 2003

(65) Prior Publication Data

US 2004/0047330 A1 Mar. 11, 2004

(30) Foreign Application Priority Data

Aug. 19, 2002 (JP) .............................. 2002-237944

(51) Int. Cl.
*H04B 7/216* (2006.01)
*H04B 7/005* (2006.01)

(52) U.S. Cl. ...................... 370/342; 455/522

(58) Field of Classification Search ................ 370/335, 370/342, 345, 350; 375/146, 147; 455/522
See application file for complete search history.

(56) References Cited

U.S. PATENT DOCUMENTS 6,442,192 B1 * 8/2002 Senda ........................ 375/146
6,677,817 B2 * 1/2004 Posner ........................ 330/52
2003/0179829 A1 * 9/2003 Pinckley et al. ............. 375/295
2003/0179833 A1 * 9/2003 Porco et al. ................ 375/297

FOREIGN PATENT DOCUMENTS

JP 09-008770 1/1997

* cited by examiner

*Primary Examiner*—Wing Chan
*Assistant Examiner*—Saba Tsegaye
(74) *Attorney, Agent, or Firm*—Venable LLP; Michael A. Sartori; Catherine M. Voorhees

(57) ABSTRACT

According to a CDMA communication system for the present invention, the transmission side for each channel increases the amplitude of a time slot period for self-channel synchronization until greater than the amplitude for another period, and outputs the resultant signal as a modulation signal. The reception side obtains a correlation between a multiplex signal obtained by superimposing modulation signals for multiple channels, and a spreading code allocated for the self-channel. Since the amplitude of the time slot period for the self-channel synchronization is increased by the transmission side, the large value portion indicating the synchronization timing is included in the correlation signal, and by detecting this value, the reception side can easily obtain the synchronization timing.

10 Claims, 9 Drawing Sheets pkt.1• 4 : PACKET FOR DATA SIGNAL FOR SPECIFIC CHANNEL

CDMA TRANSMITTER, CDMA MULTIPLEX TRANSMITTER, CDMA RECEIVER AND CDMA COMMUNICATION SYSTEM

BACKGROUND OF THE INVENTION

1. Field of the Invention

The present invention relates to a CDMA (Code Division Multiple Access) transmitter, a CDMA multiplex transmitter, a CDMA receiver and a CDMA communication system, which can, for example, be applied as a fiber-optic access system using a fiber-optic CDM (Code Division Multiplexing) technique and a PON (Passive Optical Network).

2. Related Background Art

Presently, several CDMA systems are available, including a synchronous CDMA system that obtains synchronization for each channel, an asynchronous CDMA system that does not obtain synchronization for each channel, and a quasi-synchronous CDMA system that, to a degree, permits differences in synchronized positions. When an asynchronous CDMA system or a quasi-synchronous CDMA system is employed, compared with the length (the number of chips) of code, the number of multiplexed data that can be obtained is not large. Therefore, a synchronous CDMA system, with which an equal number of chips and of multiplexed data sets can be obtained, is an appropriate CDMA communication system for the performance of multiplex transmissions.

However, since for the demodulation of multiplexed data a synchronous CDMA system requires a sync signal, in addition to an original transmission signal, a sync signal must also be transmitted.

Further, for a synchronous CDMA system employed by a radio communication system that conforms to the IS-95 standards, two codes, such as a PN (Pseudo-Noise) code and an orthogonal code, are jointly used to synchronize individual channels for transmission, with one of the codes, e.g., the PN code, being employed as a sync signal.

However, for a CDMA communication system that uses a conventional synchronous CDMA system, the reception side not only requires a despreading device, for fetching a transmission signal, but also a coherent detector, for detecting a sync signal. Thus, when a hardware arrangement is used for the two devices, the circuit size is increased, and when software is used to implement the functions of these devices, an enormous number of processing steps is required.

For a CDMA communication system embodying a synchronous CDMA system that employs two codes, one of which is a sync code, the reception side requires two correlation devices, such as a PN code correlation device and an orthogonal code correlation device, to detect the two codes, and when hardware is used to prepare an arrangement of the two devices, the size is increased, while when software is used to implement these devices, an enormous number of processing steps is required.

Therefore, a demand has arisen for a CDMA transmitter, a CDMA receiver, a CDMA multiplex transmitter and a CDMA communication system having a simple configuration for performing, on the reception side, a coherent detection process, or for, also on the reception side, a coherent detection setup for which only a small number of processing steps are required.

SUMMARY OF THE INVENTION

To resolve the above problems, according to a CDMA communication system for the present invention, the transmission side for each channel increases the amplitude for a time slot period for self-channel synchronization until greater than the amplitude for another period, and outputs the resultant signal as a modulation signal. The reception side then obtains a correlation between a multiplex signal, which is obtained by multiplexing modulation signals having a plurality of channels, and spreading code allocated for the self-channel. Subsequently, since the transmission side increases the amplitude for the period allocated for the time slot for synchronizing the self-channel, a large value, representing the synchronization timing, is provided for a correlation signal, and by capturing this value, the reception side can easily obtain the synchronization timing.

BRIEF DESCRIPTION OF THE DRAWINGS

FIGS. 4(A) to 4(G2) are timing charts for the individual sections of the CDMA receiver according to the first embodiment;

FIGS. 10(A) to 10(CN) are timing charts (2) for the individual sections of the frame processing circuit according to the second embodiment;

DETAILED DESCRIPTION OF THE PREFERRED EMBODIMENTS

(A) First Embodiment

A CDMA transmitter, a CDMA receiver, a CDMA multiplex transmitter and a CDMA communication system, in accordance with a first embodiment of the present invention, will now be described in detail while referring to the accompanying drawings.

(A-1) Configuration For The First Embodiment

Figure 1:
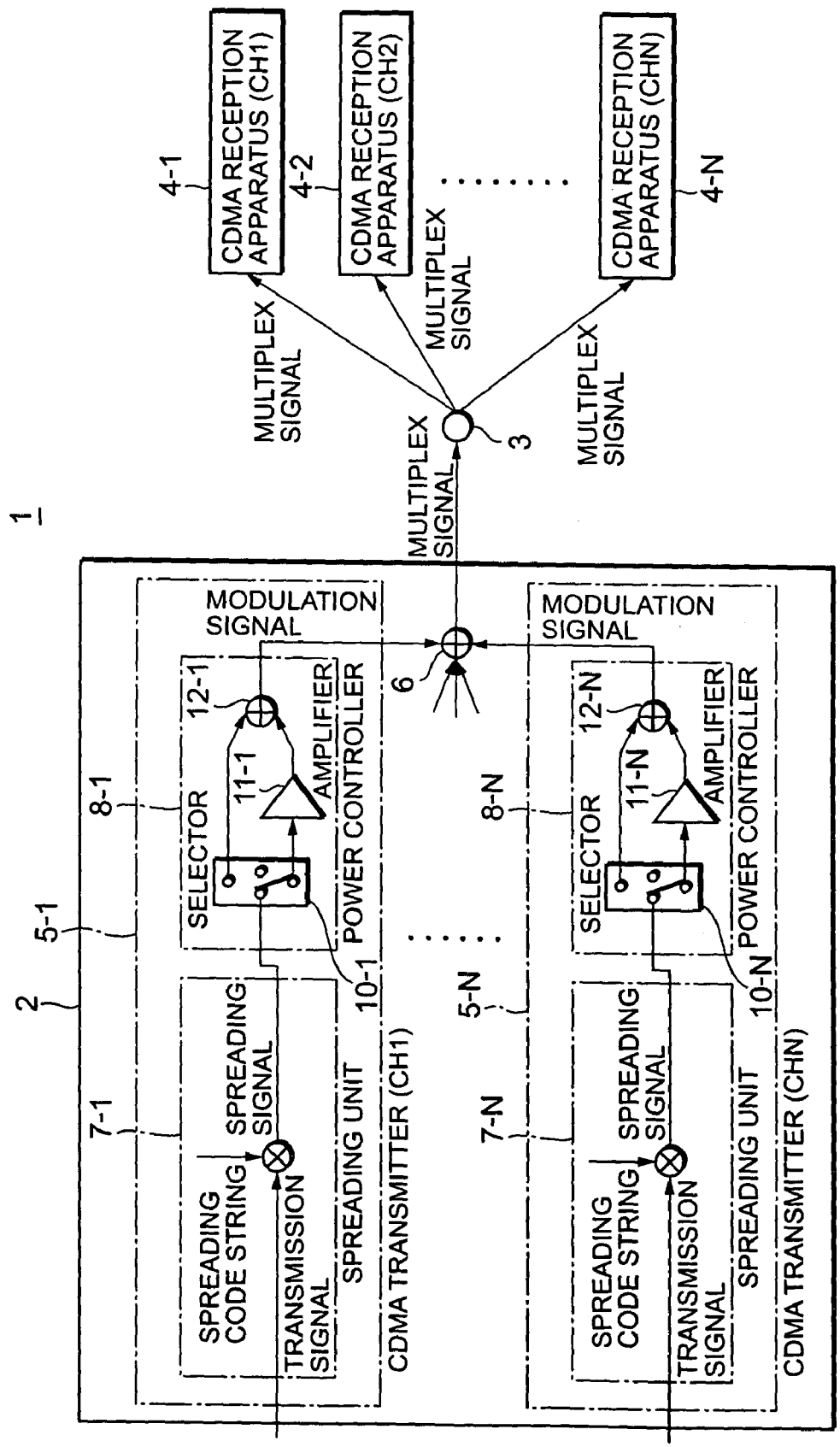
FIG. 1 is a block diagram showing the general configuration of a CDMA communication system and the internal arrangement of a CDMA multiplex transmitter according to a first embodiment of the present invention.

FIG. 1 is a block diagram showing the general configuration of a CDMA communication system and the internal arrangement of a CDMA multiplex transmitter according to the first embodiment.

In FIG. 1, a CDMA communication system 1 for the first embodiment, which is an N-channel associated (multiplex count N: N is an integer of two or greater) communication system, comprises: a CDMA multiplex transmitter 2, an allotter 3, and CDMA receivers 4-1 to 4-N for the individual channels.

The CDMA multiplex transmitter 2 includes CDMA transmitters 5-1 to 5-N for the individual channels and an addition unit (a multiplexer) 6.

The CDMA transmitters 5-1 to 5-N, for the individual channels, perform a spreading process for signals received across their channels and generate modulation signals. The addition unit 6 adds the modulation signals, for the individual channels, and generates a multiplex signal.

This multiplex signal is output by the CDMA multiplex transmitter 2. The allotter 3 is provided because it is assumed that this embodiment will be applied for signal transmission using a wire transmission path. The allotter 3 divides the multiplex signal into N signals, and supplies these signals to the CDMA receivers 4-1 to 4-N for the individual channels.

The CDMA receivers 4-1 to 4-N perform the despreading process for the received multiplex signals, and obtain signals that are supposed to be received from the corresponding CDMA transmitters 5-1- to 5-N.

Figure 2:
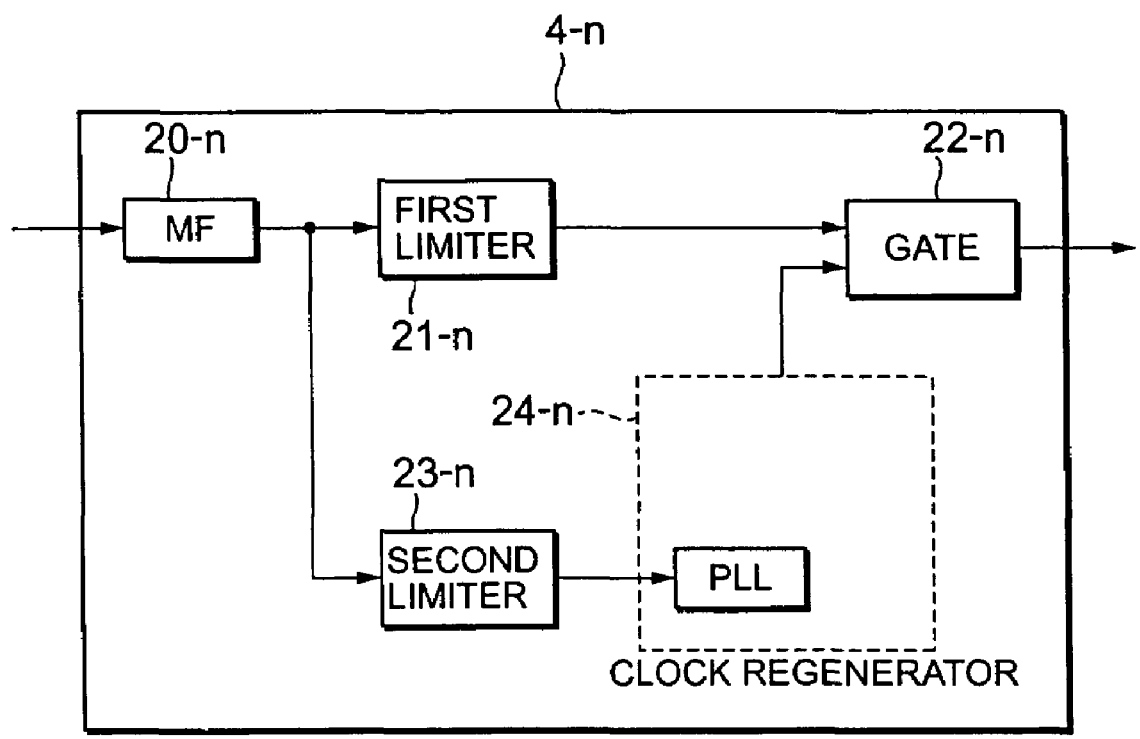
FIG. 2 is a block diagram showing the internal arrangement of a CDMA receiver according to the first embodiment.

When the wire transmission paths between the CDMA multiplex transmitter 2 and the CDMA receivers 4-1 to 4-N are optical transmission paths using an optical fiber, for example, an electric/optical converter for converting an electric signal into an optical signal is provided at the rear stage of the addition unit 6 of the CDMA multiplex transmitter 2, and an optical/electric converter for converting an optical signal into an electric signal is provided at the input stages of the CDMA receivers 4-1 to 4-N, although these converters are not shown in FIG. 1 and FIG. 2, which will be referred to later.

The CDMA transmitter 5-$n$ (n is 1 to N) for each channel has the same configuration, and includes a spreading unit 7-$n$ and a power controller 8-$n$, which has a 1-input 3-output selector 10-$n$, an amplifier 11-$n$ and an adder 12-$n$.

An input signal, into which a sync bit is inserted for each predetermined cycle of a transmission signal (a data series) for a channel, is inserted into the CDMA transmitter 5-$n$ for a corresponding channel. As is shown in FIG. 3(A), when the sync bit for a specific timing is related to a first channel (CH1), the next sync bit to be inserted is related to a second channel (CH2), and the following sync bits to be inserted are related to a third channel (CH3) and succeeding channels. Therefore, each N times the sync bit for the same channel appears. Further, the timing whereat the sync bit appears for the n-th channel is the same for all the channels (CH1 to CHN)

The spreading unit 7-$n$ of the CDMA transmitter 5-$n$ performs the spreading process for the above described input signal by using spreading code that is allocated for the self-channel.

An exclusive OR circuit can be employed for the circuit configuration of the spreading unit 7-$n$. At the time slot for an input signal of "1", the spreading code is output unchanged, while at the time slot for an input signal of "0", the inverted spreading code is output. It should be noted that a one-bit period for the input signal is called a time slot, and a one-code period for the spreading code is called a chip period.

In this embodiment, an orthogonal PN code having a satisfactory auto-correlation characteristic and a cross-correlation characteristic is employed as an example despreading code. While one time slot period of the input signal is defined as a 16-chip period or a 32-chip period, the spreading code is repetitively employed for each time slot for the input signal.

A spreading signal is transmitted by the spreading unit 7-$n$ to the 1-input 3-output selector 10-$n$. The first output terminal of the selector 10$n$ is connected to the adder 12-$n$, the second output terminal of the selector 10-$n$ is opened, and the third output terminal of the selector 10-$n$ is connected to the amplifier 11-$n$. Based on a selector control signal (not shown), the selector 10-$n$ selects the first output terminal during a period other than the sync bit period, selects the third output terminal during the sync bit period for the self-channel, and selects the second output terminal during the sync bit period for another channel.

The amplifier 11-$n$ amplifies, at a predetermined gain, a signal output by the third output terminal of the selector 10-$n$, i.e., a spreading signal for the sync bit period for the corresponding channel, and transmits the obtained signal to the adder 12-$n$.

The adder 12-$n$ adds the signal output by the first output terminal of the selector 10-$n$ to the signal output by the amplifier 11-$n$, and transmits the resultant signal to the addition unit (multiplexer) 6 as a modulation signal for the corresponding channel.

As is described above, since the selector 10-$n$ selects the first output signal during a period (a period for the transmission signal itself) other than the sync bit period, and selects the third output terminal during the sync bit period for the self-channel, the adder 12-$n$ performs time-division multiplexing for the signal. In addition, since during the sync bit period for another channel the selector 10-$n$ selects the second output terminal that is opened, no signal is output by the adder 12-$n$ during this period.

As is described above, the power controller 8-$n$ increases power during the sync bit period for the self-channel, and outputs the spreading signal for the spreading unit 7-$n$; halts the output of the spreading signal during the sync bit period for another channel; and without increasing the power, outputs the spreading signal during the period for a transmission signal.

FIG. 2 is a block diagram showing the internal arrangement of the CDMA receiver 4$n$ for an n-th channel. It should be noted that the CDMA receivers 4-1 to 4-N for the individual channels employ the same internal arrangement.

In FIG. 2, the CDMA receiver 4-$n$ comprises a matched filter 20-$n$, a first limiter 21-$n$, a gate circuit 22-$n$, a second limiter 23-$n$ and a clock regenerator 24-$n$.

A multiplex signal, which has been transmitted by the CDMA multiplex transmitter 2 and has been divided by the allotter 3, reaches the CDMA receiver 4-$n$ and is received by the matched filter 20-$n$.

The matched filter 20-$n$ uses a predetermined spreading code, allocated for the self-channel (the same spreading code as that used by the spreading unit 7-$n$ for the corresponding channel), to perform the despreading process for the received multiplex signal, and obtains a correlation signal.

For this correlation signal, a large positive correlation value is provided when the phase of the spreading signal matches the phase of the time slot period for a signal of "1" that is to be transmitted by the transmission side, or a negative correlation value is provided when the phase of the spreading signal matches the phase of the time slot period for a signal of "0" that is to be transmitted by the transmission side. It should be noted that the negative correlation value represents a negative correlation, and depending on the dynamic range that is designated for the correlation signal, may be a positive value.

In many cases, a period wherein the correlation signal has a large value is a one-chip interval. Further, as is described above, since the power for the transmission of the spreading signal, during the sync bit period for the self-channel, is set considerably higher than the power for the other periods, the correlation signal for the one-chip interval of this sync bit period can obtain a much larger positive correlation value. Further, since a match with the spreading signal can not be obtained except during a period wherein the large correlation value or the large negative correlation value is obtained, the correlation signal has a value at a no-correlation level.

The correlation signal output by the matched filter 20-$n$ is transmitted to the first limiter 21-$n$ and the second limiter 23-$n$.

The first limiter 21-$n$ and the second limiter 23-$n$ are designated for the extraction, from the correlation signal received from the matched filter 20-$n$, of a waveform having a predetermined level (threshold value) or higher. The predetermined level set for the second limiter 23-$n$ is higher than the predetermined level set for the first limiter 21-$n$.

The second limiter 23-$n$ performs the limiting process for extracting, from a correlation signal, only a considerably large positive correlation value portion that appears in association with the sync bit period for the self-channel, i.e., extracts data for a sync bit and transmits the data to the clock regenerator 24-$n$.

Based on the signal output by the second limiter 23-$n$, the clock regenerator 24-$n$ regenerates a clock that is synchronized with a time slot period (the length of which is substantially a one-chip interval) wherein a large positive correlation value (corresponding to "1") or a large negative correlation value (corresponding to "0") is provided for the correlation signal, and transmits the clock to the gate circuit 22-$n$ as a gate control signal. That is, for the regeneration of the clock, the clock regenerator 24-$n$ uses k+1 (k is the number of bits (time slots) for a transmission signal present between the adjacent sync bit periods) to perform a frequency multiplication for the output signal of the second limiter 23-$n$, which has a sync bit cycle for the self-channel. A PLL circuit that uses k+1, for example, to perform the frequency multiplication can be employed as the clock regenerator 24-$n$.

The first limiter 21-$n$ shapes, into a pulse, the wave of the large positive correlation value portion of the correlation signal received from the matched filter 20-$n$, and extracts the data describing the transmission signal.

Instead of the first limiter 21-$n$, a slicer may also be employed to shape, into a pulse, the wave of the large negative correlation value portion of the correlation signal.

The output signal of the first limiter 21-$n$ is transmitted to the gate circuit 22-$n$.

Based on the clock received from the clock regenerator 24-$n$, the gate circuit 22-$n$ performs a gating process (sampling) for the signal output by the first limiter 21-$n$, stretches, so as to fill the entire time slot period, the large positive correlation value portion and the negative correlation value portion of the signal output by the first limiter 21-$n$, and converts these portions into a data string composed of "1" and "0". A D flip-flop can be employed for the gate circuit 22-$n$.

The output signal of the gate circuit 22-$n$ includes a logical value for the sync bit period, and by removing this value, as needed, the signal to be transmitted for the same channel by the CDMA transmitter 5-$n$ can be reproduced.

(A-2) Operation for First Embodiment

The operation of the CDMA communication system in the first embodiment will now be described while referring to the timing charts in FIGS. 3 and 4 for the individual sections.

Figure 3:
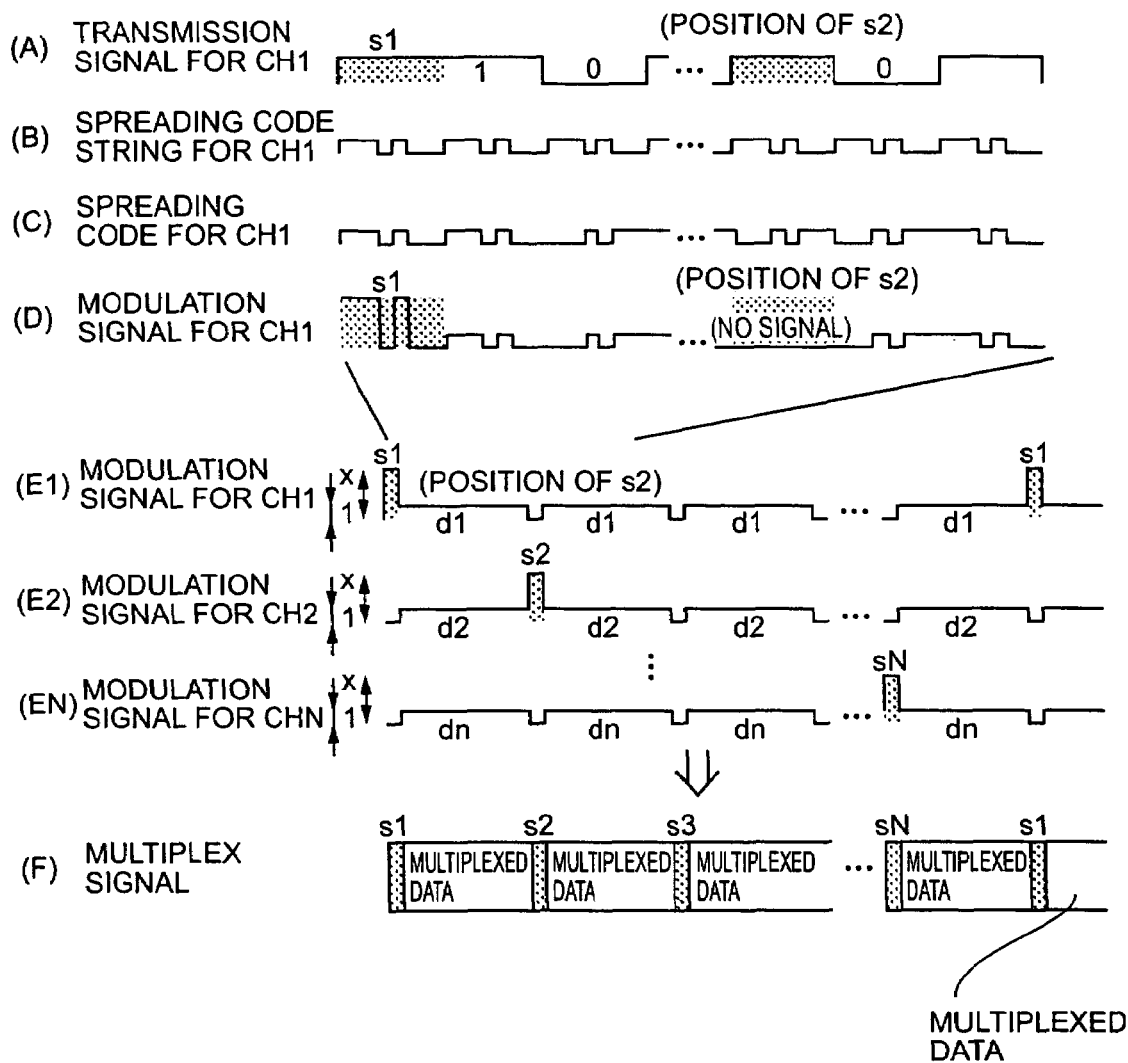
FIGS. 3(A) to 3(F) are timing charts for the individual sections of the CDMA multiplex transmitter according to the first embodiment.
Figure 4:
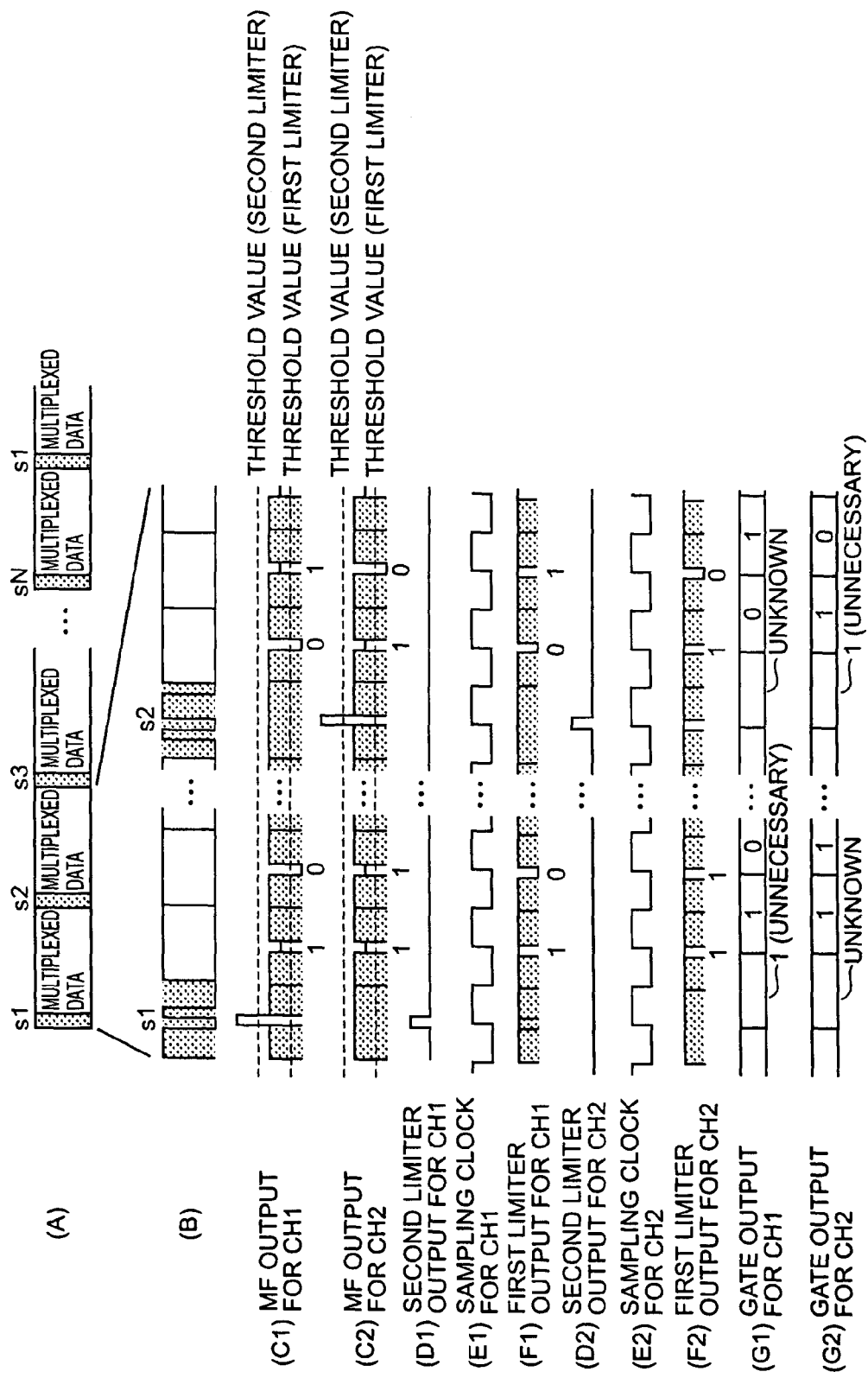

FIGS. 3(A) to 3(F) are timing charts for the individual sections of the CDMA multiplex transmitter 2, and FIGS. 4(A) to 4(G2) are timing charts for the individual sections of the CDMA receiver 4-$n$.

As is shown for the first channel CH1 in FIG. 3(A), a transmission signal, into which sync bits s1 to sN are inserted for predetermined cycles, is provided for the CDMA transmitters 5-1 to 5-N for the individual channels.

In FIG. 3(A), the sync bit s1 is the sync bit for the first channel CH1, and the sync bits s2 to sN are those for the other channels. Further, the sync bits s1 to sN in FIGS. 3(A) to 3(F) have a logical value of "1", and are synchronized with each other among the transmission signals for all the channels CH1 to CHN.

The spreading unit 7-$n$ for each channel performs a spreading process for a received signal using a predetermined spreading code string allocated for the corresponding channel, as is shown for the first channel CH1 in FIG. 3(B), and outputs a spreading signal.

Shown in FIG. 3(C) is the spreading signal for the first channel CH1, which is obtained by the spreading process performed for the transmission signal in FIG. 3(A) using the spreading code string shown in FIG. 3(B).

The spreading signal is transmitted to the power controller 8-$n$. During the sync bit period for the self-channel, the power controller 8-$n$ amplifies the spreading signal more than during the normal period, and during the sync bit period for another channel, provides a no power setting for the spreading signal. The resultant spreading signal is then output as a modulation signal. In FIG. 3(D), the modulation signal for the first channel CH1 is shown. It should here be noted that no detailed explanation will be given for the operation of the power controller 8-$n$.

In FIGS. 3(E1) to 3(EN) modulation signals for the channels CH1 to CHN are shown, and the time axis is shortened compared with that in FIG. 3(D). As is described above, during the sync bit period for the self-channel, and during the period for the transmission signal, a change in logic is present for each modulation signal in accordance with the predetermined spreading code. However, in FIGS. 3(E1) to 3(DN), these logical changes are not shown, and specifically, mainly the power levels for the modulation signals used for the individual periods are shown.

The modulation signals for the individual channels are transmitted to and superimposed (multiplexed) by the addition unit (multiplexer) 6, and the resultant signal is output as a multiplex signal by the CDMA multiplexing transmitter 2. This multiplex signal is shown in FIG. 3(F).

Since the modulation signal is set to silent during the sync bit period for another channel, the individual sync bit periods in the multiplex signal are occupied by signals that are obtained by spreading the sync bits for the channels while using the corresponding spreading codes. That is, only sync data for a specific, single channel are included for each sync bit period in the multiplex signal.

This multiplex signal is divided into N signals by the allotter 3, and for all the channels, the N signals are transmitted to the CDMA receivers 4-1 to 4-N.

In FIG. 4(A), the multiplex signal shown in FIG. 3(F) is shown, and in FIG. 4(B), the time axis for the multiplex signal in FIG. 4(A) is extended.

Upon the reception of the multiplex signal shown in FIGS. 4(A) and 4B at the CDMA receiver 4-n for a specific channel, and the matched filter 20-n, provided at the first stage, uses the predetermined spreading code string allocated for this channel to perform the despreading process for the multiplex signal and outputs a correlation signal.

In FIG. 4(C1), the correlation signal for the first channel CH1 is shown, and in FIG. 4(C2), the correlation signal for the second channel CH2 is shown. In FIGS. 4(C1) and 4(C2), the shaded portions represent non-correlated portions (values are not fixed).

For the spreading code and the multiplex signal corresponding to the first channel CH1, a match is obtained in the sync bit period s1 for the first channel CH1. Since the signal power (the amplitude) for the period s1 is set so it is higher than the normal power, a very large positive correlation value portion is obtained. While the interval wherein the spreading code match is obtained in each time slot period for the transmission signal, the signal power level is normal. Furthermore, since in each time slot period for the transmission signal the signal for another channel is also multiplexed, a positive correlation value portion or a negative correlation value portion is generated that is smaller than the correlation value for the sync bit period s1 for the first channel CH1. Since the element of the spreading code for the first channel CH1 is not included in the sync bit periods s2 to sN for the other channels, a non-correlated portion is established.

The explanation that has been given for the first channel CH1 can be applied for the other channels, and a very large positive correlation value portion can be obtained during the sync bit period for the self-channel, while during the sync bit period for each of the other channels, a non-correlated portion is established.

The very large correlation signal is transmitted to the first limiter 21-n and the second limiter 23-n.

The time width for the positive correlation value portion and the negative correlation value portion is almost a one-chip interval, i.e., is one time slot period (=one cycle of the spreading code)/the number of chips (=the chip length of the spreading code) for one time slot period.

The second limiter 23-n outputs the correlation signal for the predetermined level (the threshold value) or higher. As is shown in FIG. 4(D1) for the first channel CH1 and in FIG. 4(D2) for the second channel CH2, the output signal is formed by extracting the sync bit period for the self-channel. And the clock regenerator 24-n regenerates a clock based on the signal output by the second limiter 23-n, and transmits the clock to the gate circuit 22-n.

In FIG. 4(E1), the clock obtained for the first channel CH1 is shown, and in FIG. 4(E2), the clock obtained for the second channel CH2 is shown.

For the limiting process, the first limiter 21-n extracts the data for the transmission signal from the correlation signal output by the matched filter 20-n, and transmits the data to the gate circuit 22-n. The gate circuit 22-n performs the gate process (the sampling) based on the regenerated clock, converts the received correlation signal into a data string having a logic value of "1" or "0" for each time slot period, and outputs the data string.

In FIG. 4(F1), the signal output by the first limiter 21-1 for the first channel CH1 is shown, and in FIG. 4(F2), the signal output by the first limiter 21-2 for the second channel CH2 is shown.

In FIG. 4(G1), the signal output by the gate circuit 22-1 for the first channel CH1 is shown, and in FIG. 4(G2), the signal output by the gate circuit 22-2 for the second channel CH2 is shown.

As is shown in FIGS. 4(G1) and 4(G2), since the signal output by the gate circuit 22-n includes the cyclic sync bit, this must be removed by the circuit arrangement at the succeeding stage.

For this embodiment, the uni-directional communication received by the CDMA receivers 4-1 to 4-N from the CDMA multiplex transmitter 2 has been explained. However, when the same configurations as those for the CDMA transmitters 5-1 to 5-N are provided for the CDMA receivers 4-1 to 4-N, and data are transmitted to the CDMA multiplex transmitter 2 in synchronization with the received sync signals, the CDMA receivers 4-1 to 4-N can synchronously perform the transmission in the other direction.

(A-3) Effects of First Embodiment

As is described above, according to the configuration of the first embodiment, each CDMA transmitter increases the power of the spreading signal and transmits data during the sync bit period for a self-channel, so that the level of the correlation signal during this period is increased at each CDMA receiver. As a result, a simple arrangement that does not require extra components, such as a matched filter to be used for synchronization, can be obtained. The configuration of this embodiment can also be implemented by employing a common DSP, for example, for the software process.

Further, in this embodiment, the second limiter 23-n serves as a coherent detector. Since to perform coherent detection only the second limiter 23-n is required, the hardware configuration and/or the software processing can also be simplified.

(B) Second Embodiment

A second embodiment of the present invention, especially how it differs from the first embodiment, will now be described while referring to the accompanying drawings. In the following explanation, a cycle for a data signal into which a sync bit has been inserted is called a frame.

(B-1) Configuration For Second Embodiment

Figure 5:
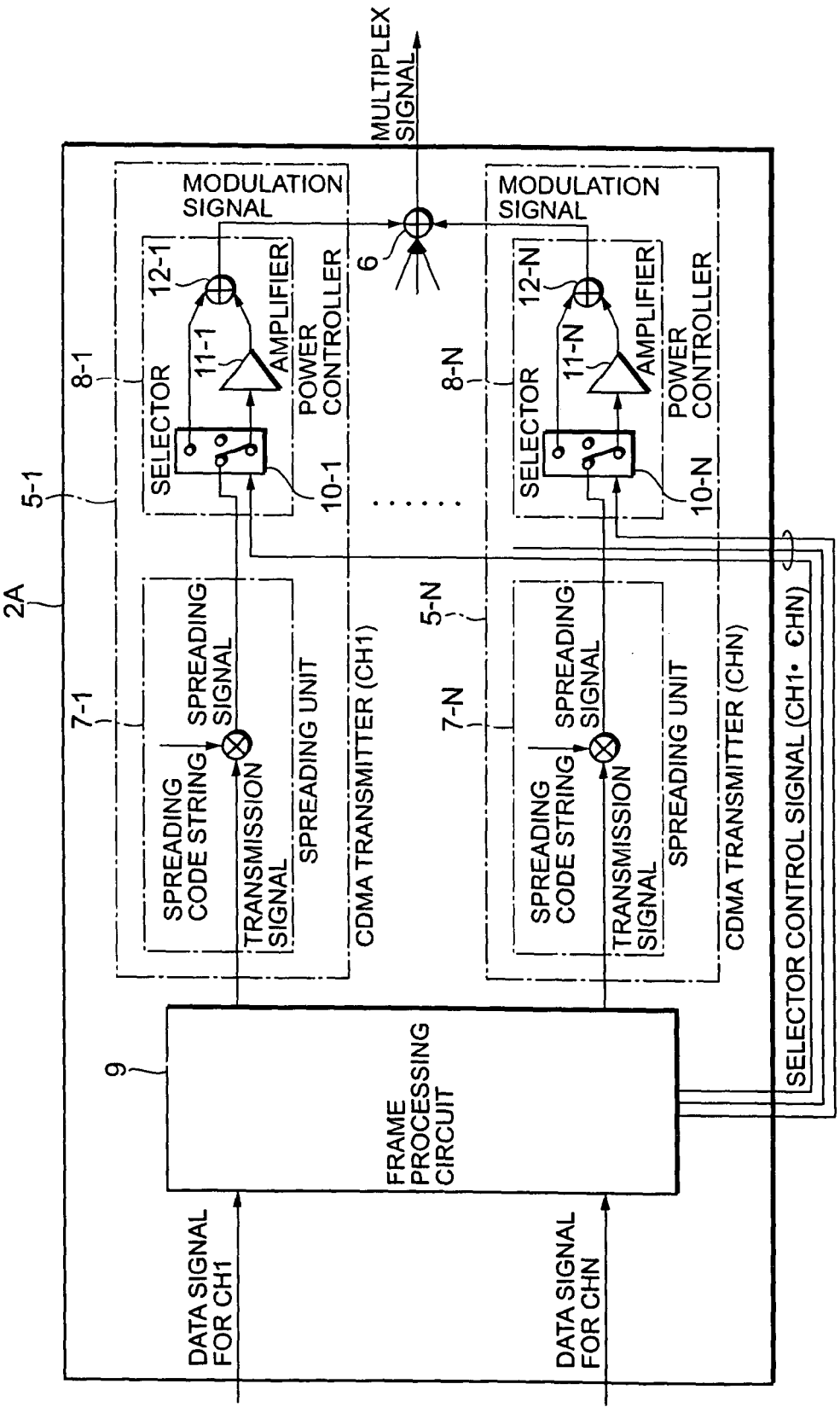
FIG. 5 is a block diagram showing the internal arrangement of a CDMA multiplex transmitter according to a second embodiment of the present invention.
Figure 6:
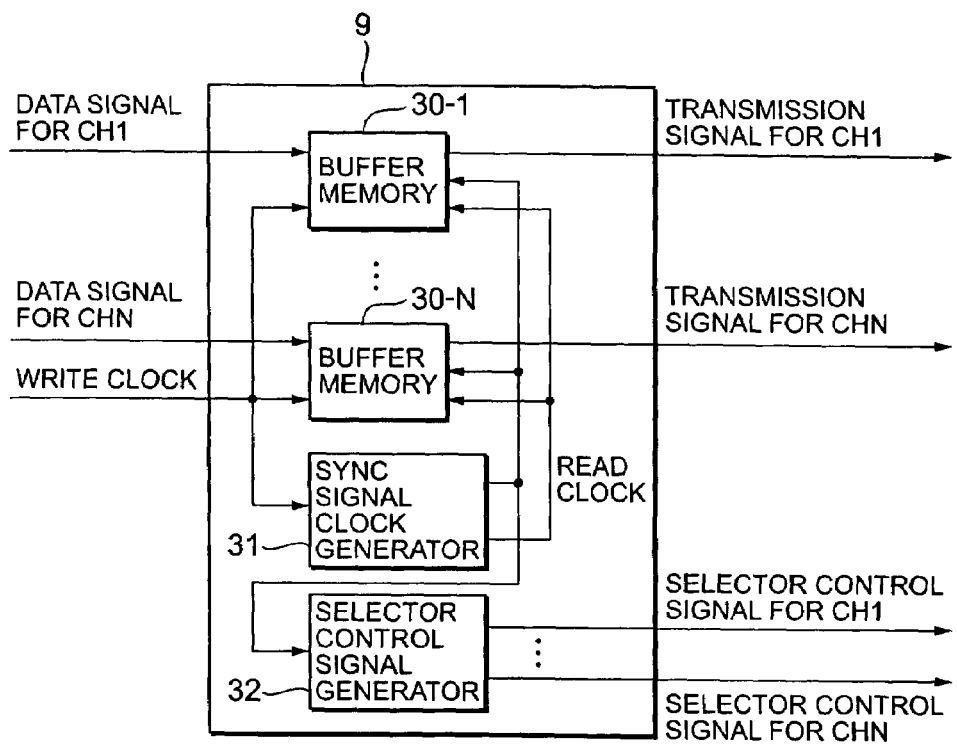
FIG. 6 is a block diagram showing the internal arrangement of a frame processing circuit according to the second embodiment.

FIG. 5 is a block diagram showing the internal arrangement of a CDMA multiplex transmitter according to the second embodiment, and FIG. 6 is a block diagram showing the arrangement of a frame processing circuit.

As is shown in FIG. 5, a CDMA multiplex transmitter 2A for the second embodiment comprises, in addition to the configuration of the CDMA multiplex transmitter 2 for the first embodiment, a frame processing circuit 9 having the structure shown in detail in FIG. 6.

For the first embodiment, no explanation has been given for the method used to form a signal to be transmitted to the CDMA multiplex transmitter 2 and for the method used to form a selector control signal for the selector 10-n, since these methods can be arbitrarily implemented. In the second embodiment, however, this signal generation is performed by the frame processing circuit 9.

It should be noted that, for the first embodiment, accurate timers, such as GPS receivers, may be provided for transmission control systems for the individual channels and may individually insert sync bits. The method used to generate an input signal and the method used to generate a selector control signal for the selector 10-n can also be provided by an arrangement other than the frame processing circuit 9 provided for the second embodiment.

The frame processing circuit 9 is located at the input stage used in common by CDMA transmitters 5-1 to 5-N for individual channels. The frame processing circuit 9 forms a transmission signal by inserting a sync bit into a data signal to be transmitted across each channel, and transmits the signal to the CDMA transmitters 5-1 to 5-N. At the same time, the frame processing circuit 9 generates selector control signals and transmits them to selectors 10-1 to 10-N in the CDMA transmitters 5-1 to 5-N.

The frame processing circuit 9 includes buffer memories 30-1 to 30-N associated with the individual channels, a sync signal clock generator 31, and a selector control signal generator 32.

Each of the buffer memories 30-1 to 30-N is formed mainly of a so-called FIFO memory, and based on a write clock used in common for all the channels, a data signal for the self-channel is written to the FIFO memory of the corresponding buffer memory 30-*n*. Furthermore, based on a read clock output by the sync signal clock generator 31, a data signal is read from the FIFO memory. Then, based on a sync signal clock received from the sync signal clock generator 31, the sync bit is inserted, for each predetermined cycle (each sync bit cycle), into the data string that has been read, and the resultant data is output.

The sync signal clock generator 31 generates the read clock and the sync signal clock in synchronization with the externally received write clock. In the following explanation, the process for inserting the sync bit into the data signal accompanies the time compression process for the data signal. However, depending on the capacities of the buffer memories 30-1 to 30-N, the data signal may be inserted without time compression being employed.

When, for example, for every M bits of the data signal a sync bit is to be inserted, a read clock having a velocity of (M+1)/M times the write clock is generated. And, for every M+1 read clocks, a sync signal clock having the same pulse width as one read clock signal is generated. This sync signal clock is transmitted not only to the buffer memories 30-1 to 30-N for all the channels, but also to a selector control signal generator 32.

Upon the reception of the sync signal clock, the selector control signal generator 32 generates selector control signals to be transmitted to the selectors 10-1 to 10-N for the individual channels.

With the selector control signals for the first channel CH1 to the N-th channel CHN, the selectors 10-1 to 10-N select a period other than that for the sync signal clock to switch to the first output terminals.

When a specific sync signal clock is generated, the selector 10-1 selects the third output terminal (the terminal for the amplifier) in accordance with the selector control signal for the first channel CH1, and at this timing, the selectors 10-2 to 10-N select the second output terminals (no signal power terminal) in accordance with the selector control signals for the second channel CH2 to the N-th channel CHN. When the next sync signal clock is generated, the selector 10-2 selects the third output terminal (the terminal for the amplifier) in accordance with the selector control signal for the second channel CH2, and at this timing, the selectors 10-1 and the selectors 10-3 to 10-N select the second output terminals (no signal power terminals) in accordance with the selector control signals for the first channel CH1 and the third channel CH3 to the N-th channel CHN.

Similarly, each time the sync signal clock is generated, a selector control signal is cyclically changed, so that a specific selector selects the third output terminal (the terminal for the amplifier), and the remaining selectors select the second output terminals.

Figure 7:
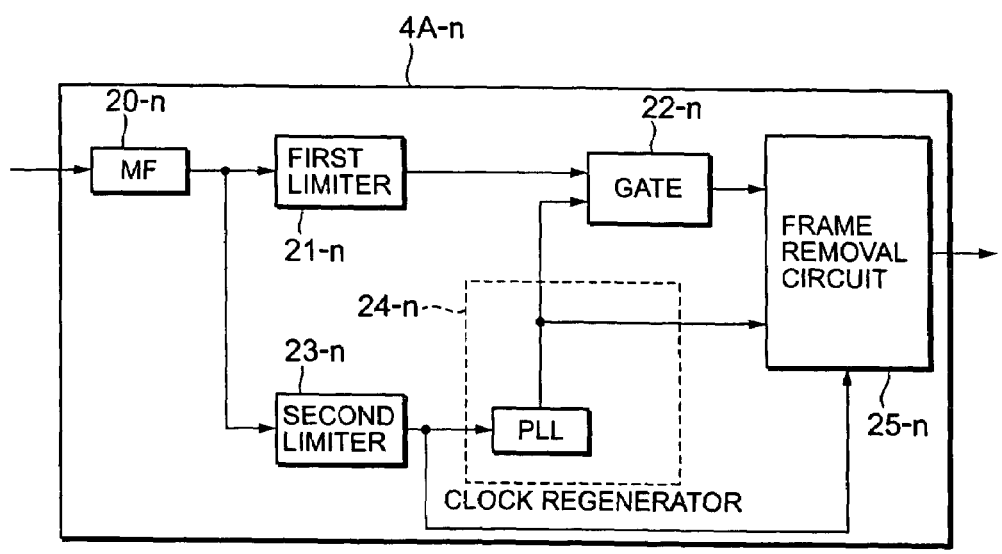
FIG. 7 is a block diagram showing the internal arrangement of a CDMA receiver according to the second embodiment.
Figure 8:
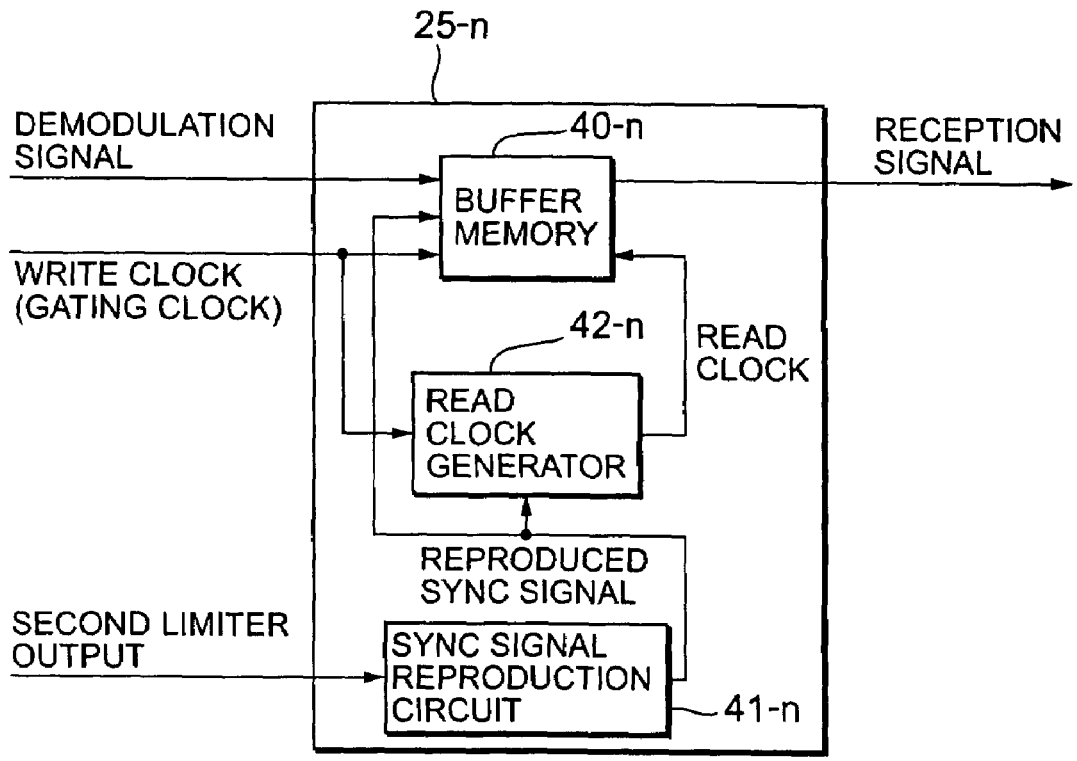
FIG. 8 is a block diagram showing the integral arrangement of a frame removal circuit according to the second embodiment.

FIG. 7 is a block diagram showing the internal arrangement of a CDMA receiver according to the second embodiment, and FIG. 8 is a block diagram showing the internal arrangement of a frame removal circuit 25-*n* shown in FIG. 7.

For the second embodiment, as is shown in FIG. 7, in addition to the arrangement of the CDMA receiver 4-*n* for the first embodiment, a CDMA receiver 4A-*n* for each channel additionally comprises the frame removal circuit 25-*n*.

As is shown in FIG. 8, the frame removal circuit 25*n* includes a buffer memory 40-*n*, a sync signal reproduction circuit 41-*n* and a read clock generator 42-*n*.

A signal (a demodulation signal) output by a gate circuit 22-*n* is written to the buffer memory 40-*n* in consonance with a regenerated clock output by a clock regenerator 24-*n*. Further, the velocity modulation is performed by reading a signal based on a read clock that is generated by the read clock generator 42-*n* and is slower than the regenerated clock. At this time, when the sync signal reproduced by the sync signal reproduction circuit 41-*n* indicates that the demodulation signal includes the sync bit period, the writing operation is halted. As a result, the sync bit is removed from the output signal (reception signal) of the buffer memory 40-*n*.

From the output signal (the sync bit detection signal) of a second limiter 23-*n*, the sync signal reproduction circuit 41-*n* reproduces a sync signal indicating the sync bit period in the demodulation signal, and transmits the sync signal to the buffer memory 40-*n*.

Upon the reception of the regenerated clock (the write clock) from the clock regenerator 24-*n* and the sync signal from the sync signal reproduction circuit 41-*n*, the read clock generator 42-*n* generates a read clock to be transmitted to the buffer memory 40-*n*.

When, for example, the demodulation signal is the signal for one sync bit to be inserted every M+1 bits, the read clock having the velocity M/(M+1) times the write clock is generated. As a result, sync bits that delimit the frame are removed from the signal (the reception signal) output by the buffer memory 40-*n*, and a simple data string is obtained.

It should be noted that, depending on the capacity of the buffer memory 40-*n*, a sync bit can be removed from the demodulation signal even though the velocities of the write clock and the read clock are the same.

Since the arrangement, except for the frame processing circuit 9 and the frame removal circuit 25-2 to 25-N for the individual channels, is the same as that for the first embodiment, no further explanation for it will be given.

(B-2) Operation For Second Embodiment

An explanation will now be given for the operations performed by the frame processing circuit 9 and the frame removal circuit 25-*n*, which are additionally provided for the second embodiment.

FIGS. 9(A) to 9(D) are timing charts showing the processing image for the buffer memory 30-*n* of the frame processing circuit 9.

Figure 9:
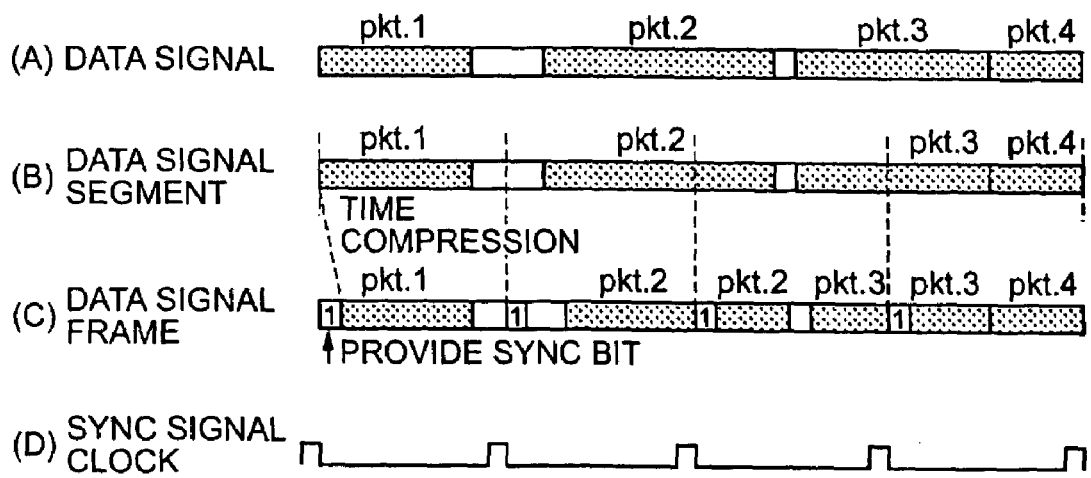
FIGS. 9(A) to 9(D) are timing charts (1) for the individual sections of the frame processing circuit according to the second embodiment.

An arbitrary form may be employed for a data signal input to the buffer memory 30-*n*, and as is shown in FIG. 9(A), for example, multiple packets pkt.1 to pkt.4 may be generated intermittently and non-continuously.

Based on the sync signal clock shown in FIG. 9(D), the data signal is divided every predetermined number of bits (frames), as is shown in FIG. 9(B), and the signal segments are stored in the buffer memory 30-$n$. As is shown in FIG. 9(C), compared with the original signal, the time for the data signal portion (the frame) of the signal output by the buffer memory 30-$n$ is compressed in accordance with the velocity difference between the write clock and the read clock, and sync bits (logic "1") are inserted into the extra portions generated by the time compression. The insertion locations for the sync bits are also determined based on the sync signal clock shown in FIG. 9(D).

The signal for a specific channel is shown in FIGS. 9(A) to 9(D); however, the frame processing circuit 9 performs the same process for data signals for the other channels.

Figure 10:
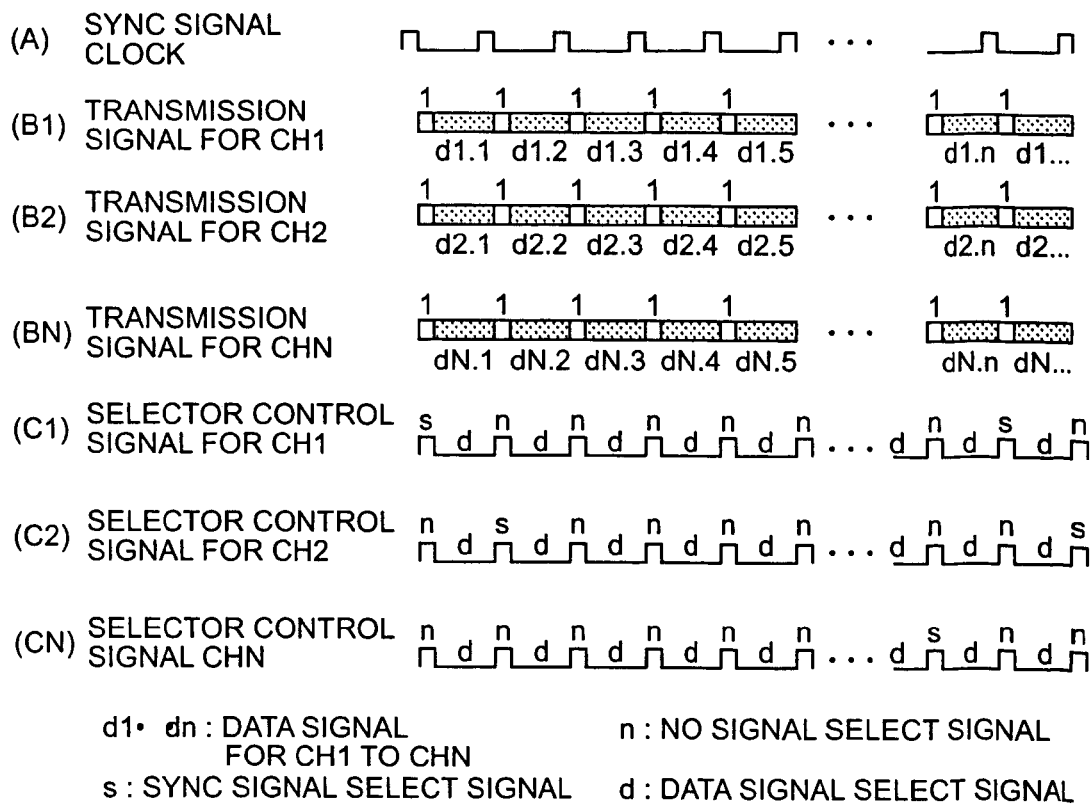

In FIG. 10(A), a sync signal clock is shown, and in FIGS. 10(B1) to 10(BN), transmission signals output by the buffer memories 30-1 to 30-N for the channels CH1 to CHN are shown.

Selector control signals for the channels CH1 to CHN in FIGS. 10(C1) to 10(CN) are generated by the selector control signal generator 32 based on the sync signal clock in FIG. 10(A). For the selector control signals shown in FIGS. 10(C1) to 10(CN), signals "s" denote sync bit select signals for instructing the transmission of the input signals of the selectors 10-1 to 10-N to corresponding amplifiers 11-1 to 11-N (to select the third output terminals). Signals "n" denote no signal select signals for instructing that no signal power be allocated for the signals input to the selectors 10-1 to 10-N (to select the second output terminals). While signals "d" denote data signal select signals for instructing the direct transmission of input signals from the selectors 10-1 to 10-N to adders 12-1 to 12-N (to select the first output terminals).

The locations of the sync bit select signals are cyclically changed in the selector control signals for all the channels CH1 to CHN. Through this process, as explained for the first embodiment, a multiplex signal is generated.

FIGS. 11(A) to 11(D) are timing charts showing the process image for the frame removal circuit 25-1 for the first channel CH1. The frame removal circuits 25-2 to 25-N for the other channels CH2 to CHN also perform the same process.

Figure 11:
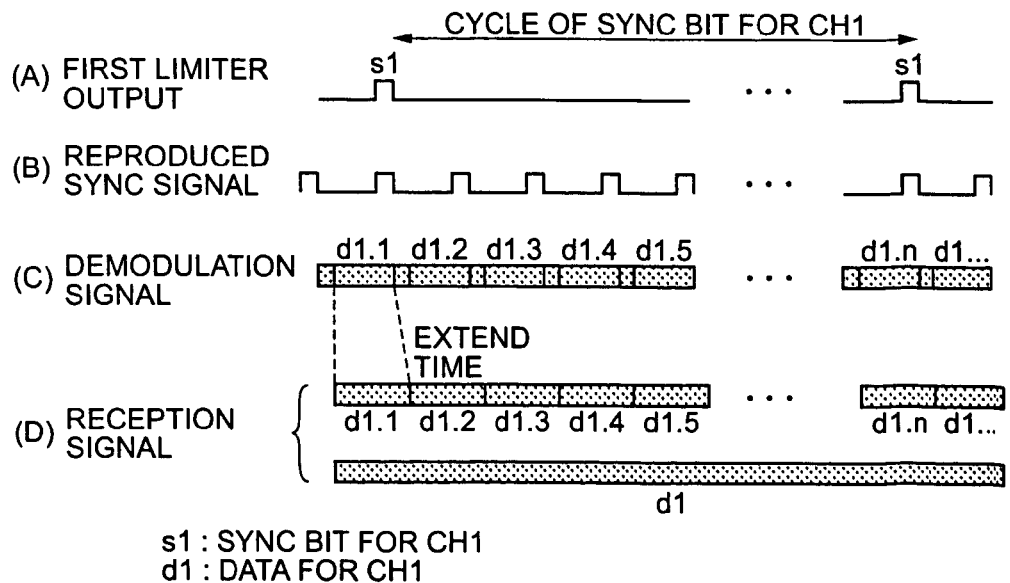
FIGS. 11(A) to 11(D) are timing charts (1) for the individual sections of the frame removal circuit according to the second embodiment.
Figure 12:
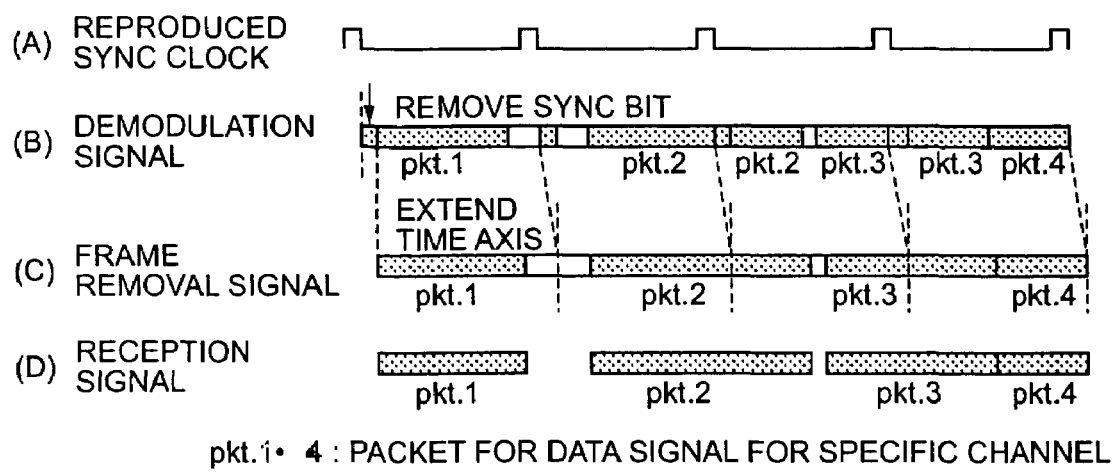
FIGS. 12(A) to 12(D) are timing charts (2) for the individual sections of the frame removal circuit according to the second embodiment.

The frame removal circuit 25-1 receives the output signal from the second limiter 23-1 in FIG. 11(A), the regenerated clock output from the clock regenerator 24-$n$ (not shown), and the demodulation signal output from the gate circuit 22-$n$ in FIG. 11(C).

In the frame removal circuit 25-1, a sync signal reproduction circuit 41-1 employs the signal output by the second limiter 23-1 to generate a reproduced sync signal in FIG. 11(B), which has a significant logical level in each sync bit period.

This reproduced sync signal defines the sync bit period in the demodulation signal shown in FIG. 11(C).

The writing process for the buffer memory 40-1 of the frame removal circuit 25-1 is performed in accordance with a clock (not shown) regenerated by the clock regenerator 24-1, and the reading process is performed in accordance with a read clock (not shown) generated by a read clock generator 42-1, so that the time axis of a data signal in the demodulation signal is extended. At this time, the sync bit included in the demodulation signal is removed. The sync bit may be removed by not performing the writing of data to the buffer memory 40-1, or by performing only the writing of data and not performing the reading of data.

In FIGS. 11(A) to 11(D), an example for receiving the sequential data signals is shown. However, the frame removal circuit 25-$n$ performs the same processing for an example as is shown in 12A to 12D for receiving a data signal when the packets pkt.1 to pkt.4 are included intermittently and non-continuously.

(B-3) Effects of Second Embodiment

In the second embodiment, the same effects can be provided as are obtained in the first embodiment. Further, according to the second embodiment, since the frame processing circuit and the frame removal circuits are provided, the sync bit insertion process using the frame concept can be performed.

(C) Other Embodiments

Various modes for the present invention have been explained in the above embodiments. In addition, the following modifications can be provided.

In the above embodiments, the output terminals of the selector 10-$n$ are switched to provide no signal power for the sync bit periods for the other channels, included in the modulation signal output by the CDMA transmitter 5-$n$. Instead of this process, the supply of the spreading code string to the spreading unit 7-$n$ may be halted during the sync bit periods for the other channels.

Further, in the embodiments, to obtain a difference in the amplitude between the spreading signal output during the sync bit period for the self-channel and the spreading signal in the transmission signal (the data signal portion), the CDMA transmitter 5-$n$ switches the output terminals of the selector 10-$n$ and amplifies only the spreading signal that is to be output during the sync bit period. Another method can also be employed. That is, only the spreading signal in the transmission signal (the data signal portion) may be attenuated, or a variable amplifier may be employed so that the amplitude gain of the spreading signal output during the sync bit period differs from the amplitude gain of the spreading signal in the transmission signal (data signal portion).

Figure 13:
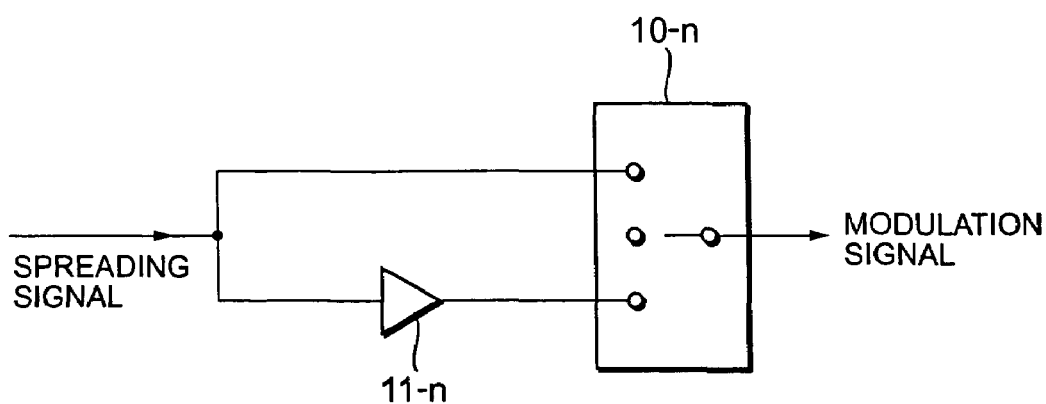
FIG. 13 is a block diagram showing another example arrangement for a power controller.

Furthermore, in the embodiments, the power controller 8-$n$ of the CDMA transmitter 5-$n$ includes the selector 10-$n$ on the input side; however, as is shown in FIG. 13, the selector 10-$n$ may be provided on the output side.

In addition, in the embodiments, the CDMA receiver 4-$n$ includes the first limiter 21-$n$; however, the gate circuit 22-$n$ may also serve as the first limiter 21-$n$ by adjusting the dynamic range designated for the gate circuit 22-$n$.

Moreover, in the embodiments, the power controller 8-$n$ of the CDMA transmitter 5-$n$ provided a no power setting for the spreading signal to be output during the sync bit period for the other channels. However, the spreading signal may be output at the same amplitude as that of the spreading signal in the transmission signal (data signal portion). In this case, it is preferable that a amplitude difference between the spreading signal output during the sync bit period for the self-channel and the spreading signal output during the sync bit period for another channel be greater than that for the embodiments.

Also, in the embodiments, the special sync bit is added to the transmission signal. Instead of inserting the special sync bit, a specific period for an input signal may be regarded as the sync bit period for the self-channel, and the amplitude of the spreading signal output during this period may be satisfactorily greater than the amplitude of the spreading signal output during another period in order to notify the reception side of the synchronization timing. With this configuration, since the value for the specific period for the correlation signal output by the matched filter is satisfactorily larger than the correlation values for the other periods, this signal can be obtained as the synchronization timing. When the synchronization timing is obtained using this method, depending on the logical value of the transmission signal during the specific period, a large positive correlation value or a large negative correlation value may be provided for the correlation signal that represents the acquired synchronization timing. Therefore, it is preferable that the second limiter cope with both positive and negative correlation values.

Further, in the embodiments, the spreading process is performed only at one stage; however, the present invention can also be applied for a configuration wherein the spreading process is performed at a plurality of stages.

Furthermore, in the embodiments, the present invention is applied for the CDMA communication system using wire transmission paths; however, the invention can also be employed for a CDMA communication system using wireless transmission paths. In this case, when CDMA transmitters for the individual channels can perform synchronous transmission using accurate timers, these CDMA transmitters can be provided separately, and signals may be multiplexed along the wireless lines.

What is claimed is:

1. A CDMA transmitter comprising:
   spreading means for employing a spreading code allocated for a self-channel to spread a transmission signal, for which a time slot having a predetermined cycle and having a different timing from that of a different channel is allocated to a synchronization time slot for the self-channel, and which is synchronized with a transmission signal for the different channel and for outputting a spreading signal;
   power control means for increasing, until greater than an amplitude for a spreading signal for a different period, an amplitude for a period for the synchronization time slot of the self-channel that is included in the spreading signal, and for outputting the resultant signal as a modulation signal; and
   no signal power setting means for performing a no signal power setting for the period for the synchronization time slot of the different channel that is included in the modulation signal,
   wherein a sync bit is inserted into the synchronization time slot.

2. A CDMA transmitter according to claim 1, wherein the power control means also serves as the no signal power setting means, and wherein to perform a no signal power setting, the power control means halts the signal input or the signal output during the period for the synchronization time slot of the different channel.

3. A CDMA transmitter according to claim 1, wherein the spreading means also serves as the no signal power setting means, and wherein, to perform the no signal power setting, the spreading means halts the spreading during the period of the synchronization time slot for the different channel.

4. A CDMA multiplex transmitter comprising:
   a plurality of CDMA transmitters according to claim 1; and
   multiplexing means for superimposing modulation signals received from the CDMA transmitters.

5. A CDMA multiplex transmitter according to claim 4, further comprising:
   frame processing means for forming normal signals for synchronization time slots, which are to be transmitted to the CDMA transmitters.

6. A CDMA multiplex transmitter according to claim 5, wherein the frame processing means adds a sync bit to a transmission signal for each channel, and forms a signal to be transmitted to each of the CDMA transmitters.

7. A CDMA receiver comprising:
   correlation means for obtaining a correlation between a multiplex signal received from a CDMA multiplex transmitter according to claim 4, and a spreading code allocated to a respective self-channel, and for outputting a correlation signal;
   synchronization timing detection means for, upon the reception of the correlation signal from the correlation means, identifying a large positive and/or negative correlation value portion included in a respective synchronization time slot for the respective self-channel;
   clock regeneration means for employing the output of the synchronization timing detection means to produce a regenerated clock having a time slot cycle; and
   gate means for sampling, in accordance with the regenerated clock, the correlation signal or a signal obtained by wave-shaping the correlation signal, and for reproducing a transmission signal.

8. A CDMA receiver according to claim 7, further comprising:
   frame removal means for removing a sync bit from an output signal of the gate means.

9. A CDMA communication system comprising:
   a CDMA multiplex transmitter according to claim 4; and
   a plurality of CDMA receivers according to claim 7.

10. A CDMA communication system comprising:
    a plurality of CDMA transmitters according to claim 1; and a plurality of CDMA receivers according to claim 7.

* * * * *